(12) United States Patent
Joye

(10) Patent No.: US 9,190,653 B2
(45) Date of Patent: Nov. 17, 2015

(54) BATTERY UNIT FOR AN ELECTRIC OR HYBRID VEHICLE

(75) Inventor: Olivier Joye, Clemont-Ferrand Cedex (FR)

(73) Assignees: COMPAGNIE GENERALE DES ETABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 13/695,616

(22) PCT Filed: Apr. 18, 2011

(86) PCT No.: PCT/EP2011/056145
§ 371 (c)(1),
(2), (4) Date: Dec. 13, 2012

(87) PCT Pub. No.: WO2011/134826
PCT Pub. Date: Nov. 3, 2011

(65) Prior Publication Data
US 2013/0115499 A1    May 9, 2013

(30) Foreign Application Priority Data

Apr. 28, 2010 (FR) ..................................... 10 53292

(51) Int. Cl.
*H01M 2/26* (2006.01)
*H01M 2/10* (2006.01)
*H01M 2/20* (2006.01)
*H01M 10/02* (2006.01)
*H01M 10/48* (2006.01)

(52) U.S. Cl.
CPC ............ *H01M 2/266* (2013.01); *H01M 2/1077* (2013.01); *H01M 2/206* (2013.01); *H01M 10/02* (2013.01); *H01M 10/482* (2013.01); *H01M 2200/103* (2013.01)

(58) Field of Classification Search
CPC .......................... H01M 2/1077; H01M 10/482
USPC ............................................................ 429/99
See application file for complete search history.

(56) References Cited

U.S. PATENT DOCUMENTS 2,379,374 A * 6/1945 Payne ........................... 429/128
4,156,756 A * 5/1979 Green ........................... 429/182
5,674,641 A   10/1997 Cheu
(Continued)

FOREIGN PATENT DOCUMENTS

CN           2773915      4/2006
WO    WO 2010/081704    7/2010

OTHER PUBLICATIONS

Office Action dated Jul. 23, 2014 issued in the corresponding Chinese Patent Application No. 201180020758.6.

*Primary Examiner* — Nicholas P D'Aniello
(74) *Attorney, Agent, or Firm* — Cozen O'Connor

(57) ABSTRACT

The accumulator assembly comprises a plurality of electrical energy accumulator elements 12 superimposed along a stacking axis, each element comprising connecting electrodes 18, 20, spacers 22, 24 positioned axially between at least some of said connecting electrodes, and assembly bars 54 extending axially through the apertures in the connecting electrodes and in the spacers. The assembly further comprises end plates 50, 52 which interact with the assembly bars to clamp the connecting electrodes and the spacers axially, and resilient prestressing means 80 which interact with at least one of the end plates to exert axial prestressing forces on the stacked connecting electrodes and spacers.

14 Claims, 2 Drawing Sheets

(56) References Cited

U.S. PATENT DOCUMENTS 6,740,446 B2 * 5/2004 Corrigan et al. .............. 429/152
2004/0021442 A1 2/2004 Higashino
2005/0123828 A1 6/2005 Oogami et al.
2007/0188130 A1 8/2007 Scheucher

* cited by examiner

BATTERY UNIT FOR AN ELECTRIC OR HYBRID VEHICLE

RELATED APPLICATIONS

This is a U.S. National Phase Application under 35 USC 371 of International Application PCT/EP2011/056145 filed on Apr. 18, 2011.

This application claims the priority of French application no. 10/53292 filed Apr. 28, 2010, the entire content of which is hereby incorporated by reference.

FIELD OF THE INVENTION

The present invention relates to the field of accumulator assemblies for electric or hybrid vehicle batteries, notably for motor vehicles.

The term "electric motor vehicle" denotes a vehicle as defined in United Nations Regulation No. 100 on the approval of battery electric vehicles.

The present invention relates more specifically to an accumulator assembly comprising a plurality of electrical energy accumulator elements which are superimposed and connected mechanically. A battery is formed by one or more accumulator assemblies and forms the electrical power source which is used for the electrical propulsion of the electric or hybrid vehicle.

BACKGROUND OF THE INVENTION

Patent application US 2006/0204840 describes an accumulator assembly formed by the alternate stacking of energy accumulator elements and stiffening plates. Fastening plates are provided for clamping the accumulator elements and plates together. These fastening plates have lugs for the passage of threaded rods interacting with nuts to form a unitary assembly.

There is also a known accumulator assembly, described in patent application US 2009/0017367, comprising a plurality of accumulator elements stacked against each other, two fastening plates at the ends of the stack, and stiffening members extending transversely between the plates and having housings adapted to receive the ends of the accumulator elements. The assembly further comprises threaded rods and nuts which are combined in order to fasten the members and keep the stack of accumulator elements assembled.

In this accumulator assembly, an electrical connecting plate is provided between the associated positive and negative electrodes of the adjacent accumulator elements. The positive electrode is mounted inside a hole formed in the connecting plate and is then soldered to the plate. The negative electrode is fastened to the plate by screwing. These operations are lengthy and costly.

U.S. Pat. No. 5,674,641 discloses another accumulator assembly which comprises a plurality of superimposed electrical energy accumulator elements, spacers positioned axially between the connecting electrodes of the accumulator elements, fastening rods extending axially through apertures in the connecting electrodes and spacers, and upper and lower end plates interacting with the rods for the assembly of the connecting electrodes and spacers.

WO 2006/068373 discloses another accumulator assembly comprising a plurality of accumulator elements stacked and mounted inside a receiving casing made in two parts. The connecting electrodes of the accumulator elements include apertures for the passage of threaded rods and a fastening for said rods on the lower part of the casing. Insulating spacers are positioned axially between the connecting electrodes of adjacent accumulator elements. These spacers support electrical connecting plates which connect the electrodes of the accumulator elements.

When these accumulator assemblies are installed, poor-quality plating of the connecting electrodes and of the means positioned axially between the electrodes may result in a defective flow of electric current.

Furthermore, in certain vehicle driving conditions, the vibrations to which these accumulator assemblies are subjected may cause a break in the electrical contact between the means positioned axially between the electrodes and the electrodes themselves. This also results in a defective supply of current.

SUMMARY OF THE INVENTION

One object of the present invention is to overcome the aforesaid drawbacks.

More specifically, one object is to provide an accumulator assembly which is easily manufactured and assembled and which is highly reliable in operation.

Another object is to provide an accumulator assembly in which the maintenance of the electrical connection between the electrodes of the energy accumulator elements is ensured.

In one embodiment, the accumulator assembly comprises a plurality of electrical energy accumulator elements superimposed along a stacking axis, each element comprising connecting electrodes, spacers positioned axially between at least some of the connecting electrodes of the accumulator elements, and assembly bars extending axially through the apertures in the connecting electrodes and in the spacers. The assembly further comprises end plates which interact with the assembly bars to clamp the connecting electrodes and the spacers axially, and resilient prestressing means which interact with at least one of the end plates to exert axial prestressing forces on the connecting electrodes and spacers which are stacked axially.

The prestressing means enable axial prestressing to be applied to the stacked connecting electrodes and spacers, in order to maintain axial contact between them, and in order to provide a good electrical connection between the various accumulator elements, even when the accumulator assembly is subjected to vibration. The prestressing means exert a continuous prestressing force in order to maintain a uniform contact pressure on the axial stack of connecting electrodes and spacers. The prestressing means also serve to compensate for any dimensional variations in the spacers and/or connecting electrodes due to temperature variations.

The prestressing means are advantageously separate from the assembly bars and the end plates.

The prestressing means can be mounted axially between some of the assembly bars and the corresponding end plate or plates. Each assembly bar can be associated with one or more prestressing means which are stacked axially.

Advantageously, the prestressing means are positioned axially between a head of each assembly bar and the corresponding end plate.

Preferably, each of the prestressing means comprises at least one resilient annular washer with axial resilience.

In one embodiment, the spacers are positioned axially between the connecting electrodes of adjacent accumulator elements.

The accumulator assembly comprises electrically conductive spacers. It can equally well comprise insulating spacers.

In one embodiment, the electrical energy accumulator elements are assembled in such a way that the positive and negative electrodes are positioned alternately along the stacking axis, so that a positive electrode of one accumulator element is axially adjacent to a negative electrode of an adjacent accumulator element. The insulating and conductive spacers can be arranged to connect the plurality of accumulator elements in series. The positive and negative connecting electrodes can be positioned alternately along the stacking axis from one accumulator element to another axially adjacent element.

Alternatively, the accumulator elements can be assembled in parallel by aligning the positive and negative electrodes respectively along the stacking axis and by installing the spacers in a suitable way.

The insulating spacers preferably each comprise a base against which at least one electrode of two axially adjacent accumulator elements bears, and an extension in contact with an outer casing of at least one of said accumulator elements.

The insulating spacers can extend at least partially so as to project, relative to the connecting electrodes and the conductive spacers, on the side opposite the accumulator elements.

In one embodiment, each of the conductive spacers includes an aperture inside which is connected a connector plug connected to an electrical wire for voltage measurement.

Insulating sleeves are advantageously provided for the mounting of the assembly bars through the apertures in the connecting electrodes and spacers.

In one embodiment, the assembly bars each include a male part including a threaded rod and a clamping head, and a female part including a mounting portion into which the threaded rod is screwed and a bearing head in contact with one of the end plates.

Advantageously, the assembly comprises means for holding in position the accumulator elements which are separate from the assembly bars.

Insulating means can be provided to insulate the electrical energy accumulator elements individually. These means preferably comprise a continuous insulating strip which zigzags between the accumulator elements so as to cover at least two opposite faces of each element.

The present invention will be made clearer by the detailed description of an embodiment provided by way of non-limiting example and illustrated by the attached drawings, in which:

DETAILED DESCRIPTION OF THE DRAWINGS

Figure 1:
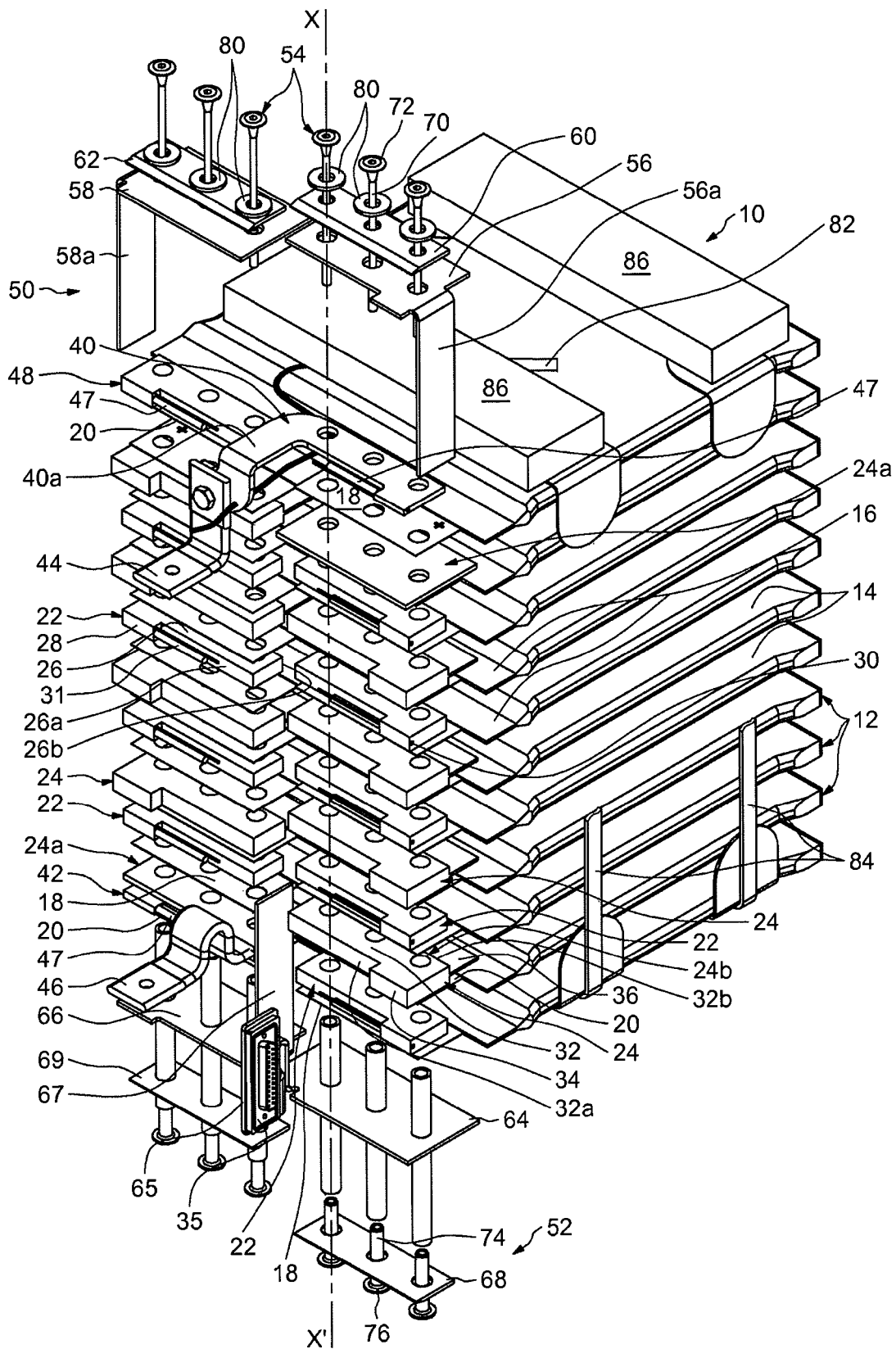
FIG. 1 is an exploded perspective view of an accumulator assembly according to an exemplary embodiment of the invention.
Figure 2:
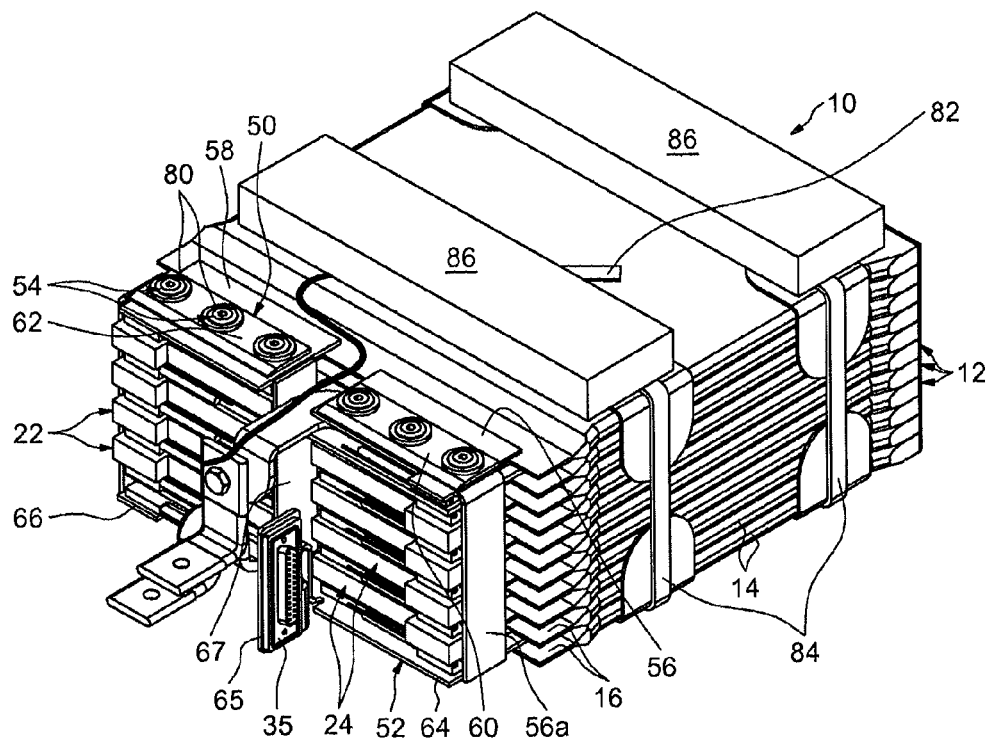
FIG. 2 is an assembled perspective view of the assembly of FIG. 1.

FIGS. 1 and 2 show an exemplary embodiment of an accumulator assembly 10 comprising a plurality of cells or electrical energy accumulator elements 12 superimposed along a stacking axis X-X' which is assumed to be vertical.

The accumulator elements 12 are identical to each other and take the form of rectangular plates. They are stacked together axially in such a way that the principal faces of two adjacent accumulator elements are turned towards each other. In the illustrated example, there are eleven accumulator elements 12. Evidently, it is possible to provide a different number of accumulator elements, depending on the electrical energy to be delivered.

Each accumulator element 12 has an outer encapsulation casing 14 inside which there are positioned a cathode and an anode, separated by an electrolyte (none of these components are shown). The electrolyte can be, for example, an aprotic electrolyte in the case of a lithium-ion accumulator element, or a polymer membrane separator in the case of a lithium-ion polymer accumulator element.

The encapsulation casing 14 has a sealed closing area 16 of reduced thickness comprising a free edge from which positive 18 and negative 20 connecting electrodes extend transversely with respect to the axis X-X'. The connecting electrodes 18, 20 are spaced transversely from one another. They take the form of tabs and are made from thin foil whose thickness is less than that of the closing area 16.

In the illustrated exemplary embodiment, the electrical energy accumulator elements 12 are arranged in such a way that the positive electrodes 18 and negative electrodes 20 are positioned alternately, with respect to the stacking axis X-X', in such a way that the positive and negative electrodes, respectively, of an accumulator element face axially towards, and are adjacent to, a negative or positive electrode, respectively, of the immediately adjacent accumulator element located below and/or above.

In order to connect the various accumulator elements 12 electrically, the assembly 10 comprises conductive spacers 22 and insulating spacers 24 positioned axially between the axially aligned connecting electrodes 18, 20. The spacers 22 are formed from an electrically conductive material, for example a metal material such as aluminium or any other appropriate material. The spacers 22 are formed from an insulating material, for example a synthetic material or any other appropriate material.

As described below, the assembly 10 comprises means for ensuring the maintenance of the electrical connection between the connecting electrodes 18, 20 of the accumulator elements 12.

In the illustrated exemplary embodiment, a conductive spacer 22 and an insulating spacer 24 are positioned between two axially adjacent accumulator elements 12, except in the case of the top accumulator element of the stack and the adjacent lower accumulator element. This is because, between these two elements, only one insulating spacer is provided between the positive electrode 18 of the top accumulator element 12 and the negative electrode 20 of the adjacent lower element, the other two electrodes 20, 18 of these two elements being directly in contact with each other.

The conductive spacers 22 are mounted axially between the positive electrode 18 of an accumulator element and the negative electrode 20 of the adjacent upper accumulator element. The insulating spacers 24 are mounted axially between the negative electrode 20 of an accumulator element and the positive electrode 18 of the adjacent upper accumulator element. The conductive spacers 22 and insulating spacers 24 are positioned alternately along the axis X-X'.

If we consider two adjacent accumulator elements 12, the conductive spacer 22 is mounted so as to bear on the upper face of the positive electrode 18 of the lower accumulator element and extends axially so as to contact the lower face of the negative electrode 20 of the upper accumulator element. Conversely, the insulating spacer 24 is positioned between the upper face of the negative electrode 20 of the lower accumulator element and the lower face of the positive electrode 18 of the upper accumulator element, coming into contact with said faces axially.

In the illustrated exemplary embodiment, the connecting electrodes 18, 20 and the conductive spacers 22 and insulating spacers 24 are positioned in such a way that the plurality of accumulator elements 12 are mounted in series. In a variant, it would be possible to provide parallel mounting of the accumulator elements. For this purpose, it would be preferable to align the positive and negative electrodes respectively along the stacking axis and to position the spacers appropriately.

The conductive spacers 22 are identical to each other, each having a base 26 which takes the form of a rectangular plate and enables the electrodes 18, 20 of two axially superimposed accumulator elements 12 to be connected electrically. For this purpose, the lower and upper surfaces of the base 26 are in contact, respectively, with the positive electrodes 18 and the negative electrodes 20 of these accumulator elements 12. A front face 26a of the base 26, located on the opposite side to the accumulator elements 12, is partially extended by a tab 28. The base 26 and the tab 28 are designed so as to cover the major part of the faces of the associated electrodes 18, 20 while being set back from or flush with the peripheral edges of said electrodes. A rear face 26b of the base 26 remains at a distance from the closing area 16 of the associated accumulator elements 12.

Each spacer 22 has a through aperture 30 formed in the tab 28 and extending transversely relative to the axis X-X' and parallel to the front face 26a of the base 26. The aperture 30 is provided for the mounting of a connector plug connected to an electrical wire 31 (shown partially) for voltage measurement. The connector plug of each electrical wire 31 forms a male plug adapted to be mounted in the associated aperture 30 which forms a female socket.

The spacers 24 include first and second sub-groups of insulating spacers 24a, 24b. The insulating spacers 24a are identical and take the form of thin rectangular plates. There are two of these spacers. The lower surface of one of these spacers 24a is mounted indirectly against the upper face of the negative electrode 20 of the bottom accumulator element 12 of the stack, as described below. The upper surface of this spacer is mounted in contact with the lower face of the positive electrode 18 of the accumulator element located axially above. The spacer 24 provides electrical insulation between these two electrodes. The other spacer 24a bears against the lower face of the positive electrode 18 of the top accumulator element 12 of the stack and the upper face of the negative electrode 20 of the accumulator element 12 located axially below.

The spacers 24b are mounted axially between the negative electrode 20 of an accumulator element and the positive electrode 18 of the adjacent upper accumulator element, in the case of the accumulator elements 12 positioned axially between the bottom and top accumulator elements of the stack.

The spacers 24b are identical to each other, each having a base 32 which takes the form of a rectangular plate and enables the electrodes 20, 18 of the axially superimposed accumulator elements 12 to be electrically insulated. The base 32 is designed so as to cover the major part of the faces of the electrodes 20 and 18, a front face 32a of said base being substantially flush with the front free edge of each electrode. The front face 32a of the base 32 is partially extended by a tab 34 extending in the form of a protrusion relative to the front free edge of each electrode, and more generally extending beyond the conductive spacers 22. The tabs 34 are aligned axially with the tabs 28 of the conductive spacers 22. The tabs 34 provide the electrical insulation between the accumulator assembly 10 and a casing (not shown) for housing the accumulator assembly.

Each spacer 24b includes a thin extension 36 extending from the rear face 32b of the base and designed to bear against one of the closing areas 16 of the accumulator elements associated with the spacer. This extension 36 prevents any contact between the negative electrodes 20 and positive electrodes 18, which are to be insulated, of two adjacent accumulator elements, if either one or both of these two electrodes becomes deformed. This is because the electrodes 18, 20 are made in the form of fine foils, which may become slightly bent and come into contact with the axially adjacent electrode, thus possibly causing a short circuit. In this way, the safety of the operation of the accumulator element 10 is increased.

The positioning of the first sub-group of spacers 24a relative to the electrodes 18, 20 and to the casings 14 of the associated accumulator elements 12 is similar to that which has been described for the second sub-group of spacers 24b.

In order to allow the assembly 10 to be connected electrically to an electrical energy user, which can advantageously be the electrical propulsion unit of the vehicle, upper attachment points 40 and lower attachment points 42 are provided for fastening power cables 44 and 46 respectively. The upper attachment point 40 is mounted so as to bear against the upper face of the positive electrode 18 of the top accumulator element of the stack. The lower attachment point 42 is mounted in contact with the upper face of the negative electrode 20 of the bottom accumulator element of said stack and the corresponding spacer 24a. The spacer 24a is thus mounted indirectly in contact with said negative electrode 20. The attachment points 40, 42 are made of an electrically conductive material.

The lower attachment point 42 has a structure identical to that of the conductive spacers 22 but has a reduced thickness. One end of the power cable 46 is clamped axially between the attachment point 42 and the corresponding spacer 24a. The upper attachment point 40 also has a structure similar to that of the spacers 22 and additionally has an extension 40a for the fastening of the power cable 44.

In a similar way to the conductive spacers 22, the attachment points 40, 42 have apertures provided for the mounting of a connector plug connected to an electrical wire 47. These electrical wires 47 enable the total voltage to be measured across the terminals of the accumulator assembly 10. This measurement is made between the positive electrode 18 of the top accumulator element and the negative electrode 20 of the bottom accumulator element of the stack.

The assembly 10 further comprises a plate 48 which has a structure identical to that of the conductive spacers 22 and which is mounted axially so as to bear on the upper face of the negative electrode 20 of the top accumulator element 12 of the stack. This plate 48 has an aperture provided for the mounting of a connector plug connected to an electrical wire 47 in order to enable the voltage of the top accumulator element 12 of the stack to be measured.

For the purpose of fixing the electrodes 18, 20 of the accumulator elements with respect to the conductive spacers 22 and insulating spacers 24, the assembly 10 comprises upper end plates 50, lower end plates 52, and assembly bars 54 interacting with the end plates to clamp the spacers and connecting electrodes axially.

The upper end plate 50 includes a first bearing plate 56 mounted in axial contact with the upper surface of the attachment point 40 and extended perpendicularly at a side edge by a downwardly extending arm 56a. The arm 56a has an axial dimension such that, in the assembled position of the accumulator elements 12, its lower end is located axially below the positive electrode 18 of the bottom accumulator element of the stack, substantially at the level of the lower end plate 52. The arm 56a extends in the vicinity of the axially stacked electrodes 18, 20 and spacers 22, 24 on the outer side of the stack, in other words on the side opposite the other stack of electrodes and spacers. The arm 56a forms a protection or barrier for ensuring the electrical insulation of the assembly 10 with respect to the casing which houses it.

The end plate 50 also has a second bearing plate 58 which comes into contact axially with the upper surface of the plate 48, and counter-plates 60, 62 which come into contact axially with the upper surfaces of the bearing plates 56, 58 respectively. A side edge of the bearing plate 58 is extended by an axial arm 58a symmetrical to the arm 56a about an axial median plane of the accumulator elements 12. The arm 58a extends axially downwards and its lower end is located axially at the level of the lower end plate 52 in the assembled position of the accumulator elements 12. The bearing plates 56, 58 are made of an insulating material.

The lower end plate 52 has first and second bearing plates 64, 66 which come into contact, respectively, with the lower faces of the positive electrode 18 and negative electrode 20 of the bottom accumulator element 12 of the stack. The bearing plate 64 has a resilient support arm 65 provided for the fastening of a connector 35 to which the ends of the electrical wires 31, 47 are fastened. A printed circuit card can be connected to the connector for measuring the voltage of each accumulator element 12 and for measuring the total voltage across the terminals of the assembly 10. A side edge of the bearing plate 66 is extended by an axial arm 67 extending upwards through the transverse space located between the two axial stacks of connecting electrodes 18, 20 and spacers 22, 24. The upper end of the axial arm 67 is located axially at the level of the bearing plate 58 of the upper end plate 50 in the assembled position of the accumulator elements 12.

The end plate 52 also has counter-plates 68, 69 which bear against the lower surfaces of the bearing plates 64, 66 respectively.

The assembly bars 54 pass axially through the stack of electrodes 18, 20 and spacers 22, 24 so as to clamp them axially between the end plates 50, 52. To enable the assembly bars 54 to be mounted, the connecting electrodes 18 and 20, the spacers 22 and 24, the attachment points 40 and 42, the plate 48, the bearing plates 56, 58, 64, 66 and the counter-plates 60, 62, 68, 69 have through apertures which are axially aligned. In the illustrated exemplary embodiment, three apertures are provided in each of these members.

The assembly bars 54 are identical to each other and are six in number. Each bar 54 has a male part including a threaded rod 70, extending axially and provided at its upper end with a tightening head 72 having a tapped hole such that a key can be inserted for screwing. Each bar 54 also has a female part comprising a cylindrical mounting portion 74 inside which there is provided a thread corresponding to that of the rod 70. The lower part of the mounting portion 74 has a bearing head 76 which comes into contact with the corresponding counter-plate 68, 69 of the lower end plate 52. When the threaded rods 70 are screwed into the mounting portions 74, the end plates 50, 52 can clamp the insulating spacers 22, 24 and the electrodes 18, 20 axially, and can provide an axial contact between them in order to create the electrical connection of the stacked accumulator elements 12.

Insulating sleeves 78 are provided for the mounting of the threaded rods 70 and the mounting portions 74 in the apertures formed in the connecting electrodes 18 and 20, the spacers 22 and 24, the plate 48, the attachment points 40 and 42, the bearing plates 56, 58, 64, 66 and the associated counter-plates. The insulating sleeves 78 are interposed between the assembly bars 54 and these apertures in order to insulate the bars electrically. For this purpose, the sleeves 78 are made of an electrically insulating material, such as silicone.

In order to maintain the axial contact between the electrodes 18, 20 of the accumulator elements and the spacers 22 and 24, the assembly 10 includes resilient prestressing means 80, each placed around one of the rods 70 of the assembly bars 54 and mounted in axial contact with the associated tightening head 72 and the corresponding counter-plate 60, 62 of the end plate 50. The prestressing means 80 are identical to each other and each takes the form of an annular washer having a rectangular cross section in the free state. The washers can be of the cup or bell type, for example. Alternatively, any other axially resilient prestressing means capable of exerting an axial prestressing force can be used.

After the assembly bars 54 have been tightened, the prestressing means 80 are capable of exerting axial forces on the upper end plate 50 so as to apply axial prestressing to the electrodes 18, 20 of the accumulator elements and the spacers 22, 24. This ensures that there will be no axial play between the two axial stacks of electrodes 18, 20 and connecting spacers, thus providing a good electrical connection between the various accumulator elements 12. Furthermore, the prestressing means 80 enable a contact pressure which is globally uniform over time to be applied between the electrodes 18, 20 and the spacers 22, 24.

Each assembly bar 54 is associated with the same number of prestressing means 80. In the illustrated exemplary embodiment, a single prestressing means 80 is provided between the tightening head 72 of each bar 54 and the upper end plate 50. As a variant, it would be possible to provide, as a replacement for or in combination with the prestressing means 80 associated with each bar 54, a prestressing means provided axially between the bearing head 76 and the lower end plate 52. It would also be feasible to use a plurality of associated prestressing means stacked axially between the head 72, 76 of the assembly bar and the corresponding end plate, with each bar 54 having the same number of prestressing means.

The assembly 10 also advantageously comprises sensors for measuring the temperature of the accumulator elements 12. A first sensor 82 is fastened to the upper face of the top accumulator element of the stack, and a second sensor can be fastened to an accumulator element located, for example, halfway up the stack. The measuring sensors can be fastened by gluing. The sensors are connected to the connector 35 by wires (not shown).

In order to insulate the accumulator elements 12 from each other individually, an insulating strip (not shown) is provided during the assembly of the various accumulator elements 12. In a first step, the insulating strip is fastened to the bottom accumulator element 12 and is wound around it so as to cover the whole of its outer casing 14. Subsequently, during the progressive stacking of the accumulator elements 12, the insulating strip is positioned so as to zigzag or wind between the stacked accumulator elements 12, in such a way that each accumulator element placed between the bottom and top accumulator elements of the stack has the opposite principal faces of its outer casing 14 covered by the insulating strip. In the case of the top accumulator element 12, the insulating strip surrounds the whole of the outer casing 14. The accumulator elements 12 are therefore stacked against each other with the interposition of an insulating strip between every two adjacent accumulator elements. By way of example, the insulating strip may take the form of a polyamide film with a width of 200 mm and a thickness of 0.125 mm.

In order to keep the accumulator elements 12 fixed with respect to each other, tightening collars 84 are provided around the stack of accumulator elements 12. Two strips of foam 86 are also glued to the portion of insulating strip covering the upper face of the top accumulator element 12 of the stack.

In the illustrated exemplary embodiment, the negative electrode 20 of the top accumulator element 12 comes directly into contact with the positive electrode 18 of the adjacent lower accumulator element. For the other axially superimposed connecting electrodes 18, 20, a conductive or insulating spacer is interposed between every two immediately successive electrodes. However, it would be possible, without departure from the scope of the present invention, to provide direct axial contact between other axially adjacent positive and negative electrodes, by providing a suitable arrangement of the spacers in order to maintain the desired electrical connection of the accumulator elements 12.

The invention claimed is:

1. An accumulator assembly comprising:
   a plurality of electrical energy accumulator elements superimposed along a stacking axis, each element comprising connecting electrodes;
   spacers positioned axially between at least some of said connecting electrodes;
   assembly bars extending axially through apertures in the connecting electrodes and in the spacers, each assembly bar comprising a threaded rod and a tightening head;
   end plates configured to interact with the assembly bars to clamp the connecting electrodes and the spacers axially; and
   plural resilient prestressing means each of which interact with at least one of the end plates to exert axial prestressing forces on the stacked connecting electrodes and spacers, each of the resilient prestressing means being axially offset outwards relative to a corresponding end plate,
   each resilient prestressing means being arranged around the threaded rod of one of the assembly bars extending through the apertures in the connecting electrodes and in the spacers, and
   each resilient prestressing means being arranged axially between the tightening head of said assembly bar and the corresponding end plate and being mounted in axial contact with said end plate and said tightening head.

2. The assembly according to claim 1, wherein each of the prestressing means comprises at least one axially resilient annular washer.

3. The assembly according to claim 1, wherein the spacers are placed axially between the connecting electrodes of adjacent accumulator elements.

4. The assembly according to claim 1, comprising electrically conductive spacers.

5. The assembly according to claim 4, further comprising insulating spacers.

6. The assembly according to claim 5, wherein the electrical energy accumulator elements are assembled in such a way that the positive and negative electrodes are positioned alternately along the stacking axis, so that a positive electrode of one accumulator element is axially adjacent to a negative electrode of an adjacent accumulator element, the insulating and conductive spacers being arranged to connect the plurality of accumulator elements in series.

7. The assembly according to claim 6, wherein the insulating spacers each comprise a base against which at least one connecting electrode of two axially adjacent accumulator elements bears, and an extension in contact with an outer casing of at least one of said accumulator elements.

8. The assembly according to claim 5, wherein the insulating spacers extend at least partially so as to project, relative to the connecting electrodes and the conductive spacers, on the side opposite the accumulator elements.

9. The assembly according to claim 4, wherein the conductive spacers each comprise an aperture inside which a connecting plug connected to an electrical wire is connected.

10. The assembly according to claim 1, comprising insulating sleeves for mounting the assembly bars through the apertures of the connecting electrodes and the spacers.

11. The assembly according to claim 1, wherein the assembly bars each include a male part including the threaded rod and the tightening head, and a female part including a mounting portion into which the threaded rod is screwed and a bearing head in contact with one of the end plates.

12. The assembly according to claim 1, comprising means for keeping the accumulator elements in position which are separate from the assembly bars.

13. The assembly according to claim 1, comprising insulating means for insulating the electrical energy accumulator elements individually.

14. The assembly according to claim 13, wherein the insulating means comprise a continuous insulating strip zigzagging between the accumulator elements so as to cover at least two opposite faces of each element.

* * * * *